United States Patent
Park et al.

(10) Patent No.: US 8,340,398 B2
(45) Date of Patent: Dec. 25, 2012

(54) CORRELATION EXTRACT METHOD FOR GENERATING 3D MOTION DATA, AND MOTION CAPTURE SYSTEM AND METHOD FOR EASY COMPOSITION OF HUMANOID CHARACTER ON REAL BACKGROUND IMAGE USING THE SAME

(75) Inventors: Chang Joon Park, Taejon (KR); Jung Jae Yu, Gyeonggi-do (KR); Jae Kwang Lee, Taejon (KR); In Ho Lee, Taejon (KR)

(73) Assignee: Electronics and Telecommunications Research Institute, Taejeon (KR)

( * ) Notice: Subject to any disclaimer, the term of this patent is extended or adjusted under 35 U.S.C. 154(b) by 1395 days.

(21) Appl. No.: 11/948,923

(22) Filed: Nov. 30, 2007

(65) Prior Publication Data

US 2008/0130985 A1 Jun. 5, 2008

(30) Foreign Application Priority Data

Dec. 2, 2006 (KR) .................. 10-2006-0121097
Sep. 5, 2007 (KR) .................. 10-2007-0089855

(51) Int. Cl.
*G06K 9/00* (2006.01)
*G06T 15/00* (2006.01)
*H04N 9/74* (2006.01)

(52) U.S. Cl. ............... 382/154; 345/419; 348/586

(58) Field of Classification Search ........... 348/586; 382/284, 154; 345/419

See application file for complete search history.

(56) References Cited

U.S. PATENT DOCUMENTS 5,889,550 A 3/1999 Reynolds
6,064,749 A 5/2000 Hirota et al.
(Continued)

FOREIGN PATENT DOCUMENTS

KR 20040107954 12/2004
(Continued)

OTHER PUBLICATIONS

Inamoto et al., "Free viewpoint video synthesis and presentation of sporting events for mixed reality entertainment," ACE'04, Jun. 3-5, 2004, Singapore.*

(Continued)

*Primary Examiner* — Anand Bhatnagar
*Assistant Examiner* — Soo Park
(74) *Attorney, Agent, or Firm* — Rabin & Berdo, P.C.

(57) ABSTRACT

Provided are a method for extracting a correlation to generate 3D motion data, and a motion capture system and method using the extracting method to easily compose a humanoid character on a real background image. Cameras for motion capture are installed in a real background capture location (such as an outdoor location or in a studio), and the correlation between motion capture fixed cameras and a moving camera for capturing a real background image is obtained to capture 3D motion data prior to performing motion capture for integrating a humanoid character, so that even when there is interaction between a 3D figure and an actual prop such as a chair or table within the captured space, a humanoid character can easily be composed with the real background.

9 Claims, 4 Drawing Sheets

U.S. PATENT DOCUMENTS

| | | | |
|---|---|---|---|
| 6,741,241 B1 * | 5/2004 | Jaubert et al. | 345/419 |
| 2003/0185461 A1 * | 10/2003 | Ohshima | 382/284 |
| 2005/0140802 A1 * | 6/2005 | Nam | 348/239 |
| 2006/0165310 A1 * | 7/2006 | Mack | 382/284 |
| 2006/0188131 A1 | 8/2006 | Zhang et al. | |
| 2006/0222072 A1 | 10/2006 | Ramakrishnan | |
| 2007/0009028 A1 * | 1/2007 | Lee et al. | 375/240.08 |
| 2007/0248283 A1 * | 10/2007 | Mack et al. | 382/284 |

FOREIGN PATENT DOCUMENTS

| | | |
|---|---|---|
| KR | 2005-0082678 | 8/2005 |
| WO | 03010966 | 2/2003 |

OTHER PUBLICATIONS

Abad et al., "On the integration of synthetic objects with real-world scenes," Eurographics 2002.*

Ito et al., "Free-viewpoint image synthesis from multiple-view images taken with uncalibrated moving cameras," ICIP 2005.*

Prince et al., "3D live: real time captured content for mixed reality," ISMAR'02.*

Yaguchi et al., "Arbitrary viewpoint video synthesis from multiple uncalibrated cameras," IEEE transactions on Systems, Man, Cybernetics, Part B: Cybernetics, vol. 34, No. 1, pp. 430-439, Feb. 2004.*

Shinko Y. Cheng, "Hand Pose Estimation Using Expectation-Constrained-Maximization from Voxel Data" Hand Pose Estimation Technical Report, CVRR Laboratory, Nov. 2004.

A. Azarbayejani et al., "Real-Time Self-Calibrating Stereo Person Tracking Using 3-D Shape Estimation from Blob Features," icpr, p. 627, 13th International Conference on Pattern Recognition (ICPR'96)—vol. 3, 1996.

* cited by examiner (a)

(b)

(c)

(a)

(b)

(c)

CORRELATION EXTRACT METHOD FOR GENERATING 3D MOTION DATA, AND MOTION CAPTURE SYSTEM AND METHOD FOR EASY COMPOSITION OF HUMANOID CHARACTER ON REAL BACKGROUND IMAGE USING THE SAME

BACKGROUND OF THE INVENTION

1. Field of the Invention

The present invention relates to a motion capture method for easily composing a humanoid character on a real background image, and more particularly, to a method that can accurately match a humanoid character to a real background image by installing cameras for motion capture on-site (outdoors or in a studio) to capture a real background image, and obtaining the correlation between fixed cameras and cameras for capturing the real background image prior to performing motion capturing of the humanoid character for composition, in order to capture 3D motion data.

The present invention is based on a portion of research performed in the IT New Growth Engine Core Technology Development Project, a collaborative effort of the Ministry of Information and Communication of the Republic of Korea and the Institute for Information Technology Advancement, entitled "Development of Realistic Digital Image Contents Production Software", Filing No. 2005-S-003-02.

2. Description of the Related Art

Methods of generating motion data for humanoid characters in the related art include wearing infrared reflectors or emitters, ultrasound generators, magnetic sensors, fiber optics, etc. on regions of appendage joints, and reproducing 3D positions of sensors.

This method uses markers or sensors attached to joints to detect 3D positions of the joints, so that accurate capture of a character's motion data is possible; however, because the method is not linked to an integrated background image, a substantial amount of editing must be performed on the captured data in order to allow interaction by the character with a real object or another character. Thus, much time must be spent in the composition process.

Also, in a method of extracting background geometric data by tracking a camera against a background image, while there is a way to extract a 3D geometric structure of a prop in a real background, generation of motion capture data with respect to a human form is not possible.

Therefore, because motion capture and capture of a real background image is performed separately in the related art, it is difficult to integrate a character (to which motion capture data is applied) with a real background. Especially when there is interaction with a prop or a third party, much manual work is required, thus consuming much time for composition.

SUMMARY OF THE INVENTION

Accordingly, the present invention is directed to a correlation extract method for generating 3D motion data, and a motion capture system and method for easy composition of a humanoid character on a real background image using the correlation extract method, which substantially obviate one or more problems due to limitations and disadvantages of the related art.

It is an object of the present invention to provide a method of generating 3D humanoid character motion data, capable of automatically composing a real subject within a real captured background image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a motion capture system for easy composition of a humanoid character on a real background image, the motion capture system including a calibration frame for calibrating positions of a fixed camera for motion capture and a moving camera for capturing a real background, a fixed camera for capturing the calibration frame and a background marker or a corner point in a real background, and movement of a moving subject, a moving camera for moving and capturing the real background, and a motion capture processor for generating 3D motion data that extracts and automatically integrates a geometric correlation of the fixed camera and the moving camera with the real background.

The motion capture processor may include a correlation extractor for determining 3D geometric relative positions of the fixed camera and the background marker or the corner point, and extracting a geometric correlation of the fixed camera and the moving camera, and a 3D motion data generator for generating 3D motion data that automatically integrates the captured movement of the moving subject with the real background, according to the extracted geometric correlation.

In another aspect of the present invention, there is provided a method of correlation extraction for generating 3D (three-dimensional) motion data, the method including the steps of obtaining a geometric relation between a calibration frame and a background marker or a corner point in a real background, obtaining 3D geometric relative positions of a camera for motion capture and the background marker or the corner point, from the obtained geometric relation through the calibration frame, and extracting a correlation between the camera for motion capture and a moving camera for capturing a real background, through obtaining 3D geometric relative positions of the camera for motion capture and the camera for capturing a real background, from the obtained 3D geometric relative positions of the camera for motion capture and the background marker or the corner point.

In a further aspect of the present invention, a method of motion capture using a fixed camera for motion capture and a moving camera for capturing a real background, the method for easily integrating a humanoid character with a real background image, and including the steps of extracting a geometric correlation of the fixed camera and the moving camera, and using the extracted correlation to capture motion of a real moving subject and generate 3D motion data automatically integrating the captured motion with the real background.

The step of extracting the geometric correlation may include the steps of obtaining a geometric relation between the fixed camera and a calibration frame, obtaining a geometric relation between the calibration frame and a background marker captured by the moving camera or a corner point in the real background, obtaining 3D geometric relative positions of the fixed camera and the background marker or the corner point, using the obtained geometric relation through the calibration frame, and obtaining 3D geometric relative positions of the fixed camera and the moving camera from the obtained 3D geometric relative positions of the fixed camera and the background marker or the corner point, and extracting a correlation of the fixed camera and the moving camera.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

A detailed description of a motion capture method according to the present invention will be given below with reference to FIGS. 1 and 2.

Figure 1:
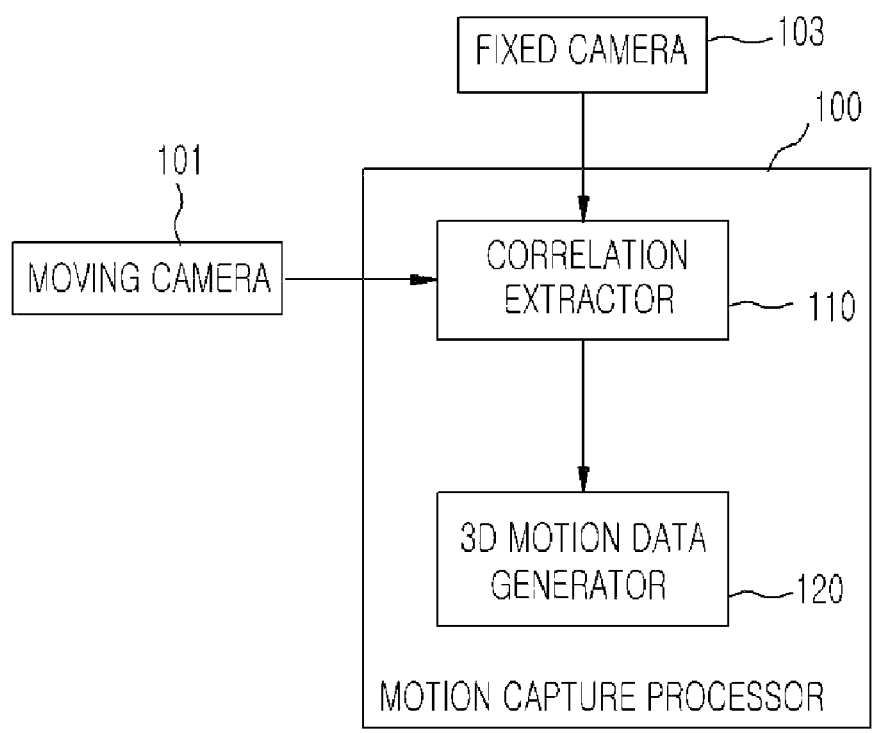
FIG. 1 illustrates a configurative block diagram of a motion capture apparatus that generates 3D motion data for easily composing a humanoid character with a real background image, according to the present invention.

FIG. 1 illustrates a configurative block diagram of a motion capture apparatus that generates 3D motion data for easily composing a humanoid character with a real background image, according to the present invention.

Referring to FIG. 1, a motion capture processor 100 according to the present invention extracts a geometric correlation between a fixed camera 103 (for motion capture that captures a calibration frame and a background marker or a corner pointer in a background, and captures motion of a moving subject) and a moving camera 101 (that captures a real background while moving), and generates 3D motion data that automatically composes the real subject and background.

This motion capture processor 100 includes a correlation extractor 110 that extracts geometric correlations between the fixed camera 103 for motion capture and a moving camera 101 for capturing a real background after determining mutual 3D geometric positions of a fixed camera 103 for motion capture and a background marker or a corner point in a background, and a 3D motion data generator 120 that captures the motion of a real moving subject according to the extracted correlations and generates 3D motion data to compose the subject with the real background.

The calibration frame is for calibrating the positions of the fixed camera 103 for motion capture and the moving camera 101 for capturing a real background.

Figure 2:
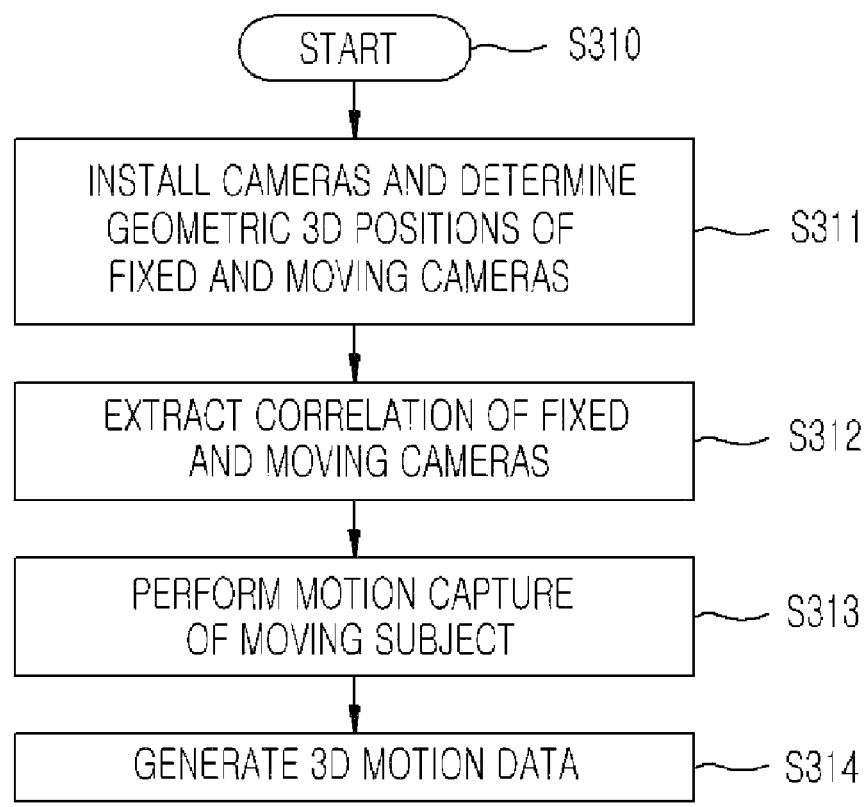
FIG. 2 illustrates a flowchart a motion capture method that generates 3D motion data for easily composing a humanoid character with a real background image, according to the present invention.

FIG. 2 illustrates a flowchart a motion capture method that generates 3D motion data using correlations between a fixed camera 103 and a moving camera 101, according to the present invention.

The present invention can largely be divided into two stages: a preparatory stage and an actual operating stage. First, in the preparatory stage, the correlation between the fixed camera 103 for motion capture and the moving camera 101 for capturing a real background is extracted and saved.

Specifically, the system and program are activated in step S210, the moving camera 101 is set to simultaneously observe the calibration frame 102 and the background marker 104 or the background corner point, and a plurality of fixed cameras 103 are installed on tripods or fixed by being inserted into props in step S211.

Thus, the calibration frame 102 is used to respectively calibrate (calculate respective locations of) the fixed cameras 103 for motion capture and the moving camera 101 for capturing the real background, and determine in step S211 the 3D geometric relative positions of the moving camera 101 for capturing the real background and the fixed cameras 103 for motion capture.

The two calibrated fixed cameras 103 are used to calculate the geometric position of a background marker 104 (or background corner point) through triangulation, in order to determine the 3D geometric relative positions of the moving camera 101, the fixed cameras 103, and the background marker 104 or background corner point with respect to the calibration frame, in step S211.

By determining the mutual locations of the fixed cameras 103 for motion capture and the moving camera 101 for capturing the real background, with respect to the calibration frame, the mutual positions (correlation) of the fixed cameras 103 and the moving camera 101 may be determined in step S212.

As described, after the correlation between the fixed cameras and the moving camera is extracted and saved in the preparatory stage, the actual operating stage is performed in steps S213 and S214.

The fixed cameras perform motion capture of an actual moving subject in step S213, and the extracted correlation is applied to the actual background image captured by the moving camera, to generate accurately composed 3D motion data in step S214.

Thereafter, the actual operating stage that is performed after the preparatory stage of the above motion capture method will be described in detail with reference to FIGS. 3 and 4.

Figure 3:
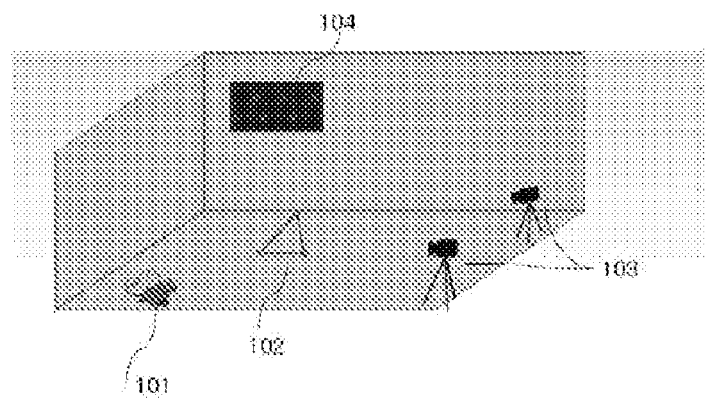
FIG. 3 illustrates examples of extracting correlations between fixed cameras for motion capturing and moving cameras for capturing real background images, where (a) illustrates extracting an initial correlation between fixed cameras and a moving camera, (b) illustrates extracting a correlation between the fixed cameras and the moving camera at another position, and (c) illustrates extracting a correlation between the fixed cameras and the moving camera at yet another position.
Figure 3:
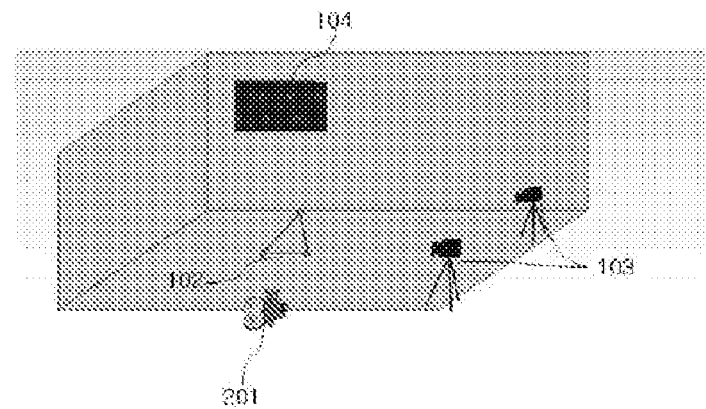
Figure 3:
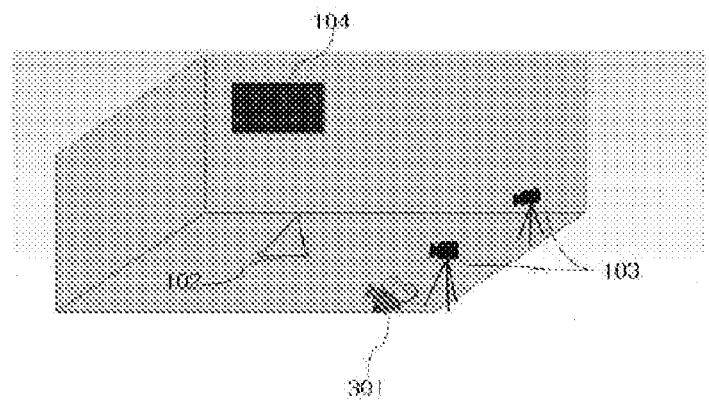

FIG. 3 illustrates examples of extracting correlations between fixed cameras for motion capturing and moving cameras for capturing real background images, for the motion capture in FIG. 2.

FIG. 3(a) illustrates the extraction of an initial correlation between fixed cameras for motion capture and a moving camera for capturing a real background image, and is configured with a moving camera 101 for capturing an actual background image, a calibration frame 102, fixed cameras 103 for motion capture, and a background marker 104, with the fixed cameras 103 installed on tripods or fixed by inserting in props.

The fixed cameras 103 for motion capture are thus installed in a real background (outdoors or in a studio), and correlation of the fixed cameras 103 and the moving camera 101 is obtained.

The initial correlation between the fixed cameras 103 for motion capture and the moving camera 101 for capturing a real background image is first obtained using the calibration frame 102 as a medium for a pre-calculation of the respective positions of the fixed cameras.

That is, by obtaining the geometric relation of the calibration frame 102 to the real background data through the moving camera 101, the initial correlation between the fixed cameras 103 and the moving camera 101 can be obtained.

Here, the moving camera 101, 201, and 301 is positioned to simultaneously observe the calibration frame 102 for calibrating the fixed cameras 103 and the marker installed in the background or the corner point in the background.

FIG. 3(b) illustrates extracting a correlation between the fixed cameras 103 and the moving camera 201 at another position, and FIG. 3(c) illustrates extracting a correlation between the fixed cameras 103 and the moving camera 301 at yet another position.

Referring to FIGS. 3(b) and 3(c), through compositions of a background marker 104 (or a background corner point) captured by the moving camera 201 and 301 at other positions, the other positions of the moving camera 201 and 301 can be calculated, and simultaneously, the correlation between the moving camera 201 and 301 and the fixed cameras 103 can be extracted through the respective positions of the background marker 104 and the fixed cameras 103.

Accordingly, through extraction of the correlation between the positions of the moving camera 101, 201, and 301 and the fixed cameras 103 in FIGS. 3(a) to 3(c), the 3D respective position correlation between the fixed cameras 103 for motion capture and the background marker 104 or the corner point in the background is obtained.

As described above, by extracting the correlation of the fixed cameras 103 and the moving camera 101, 201, and 301 beforehand, even when the calibration frame is deleted from the capture area during actual motion capture, the background marker or background corner point can be used to extract a correlation between the fixed cameras for motion capture and the moving camera for capturing the real background image.

According to the present invention, the background marker 104 or the background corner point used are not limited to markers or corner points, and may be embodied in all forms of single points, lines, surfaces, etc. that are helpful in extracting 3D geometric data of a background.

Figure 4:
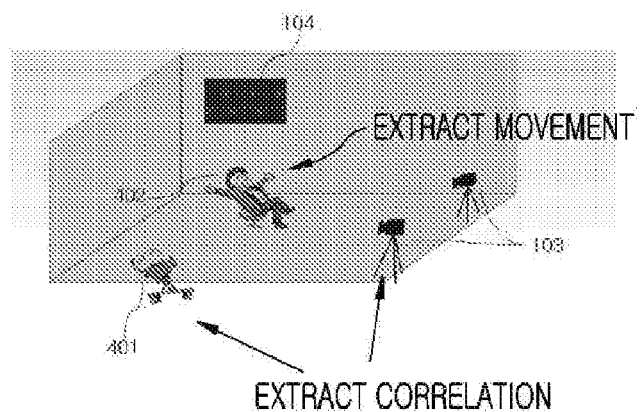
FIG. 4 illustrates examples of generating 3D motion data capable of being automatically composed with a real background image according to the motion capture method in FIG. 2, where (a) illustrates a first position of the moving camera, (b) illustrates a second position of the moving camera, and (c) illustrates a third position of the moving camera.
Figure 4:
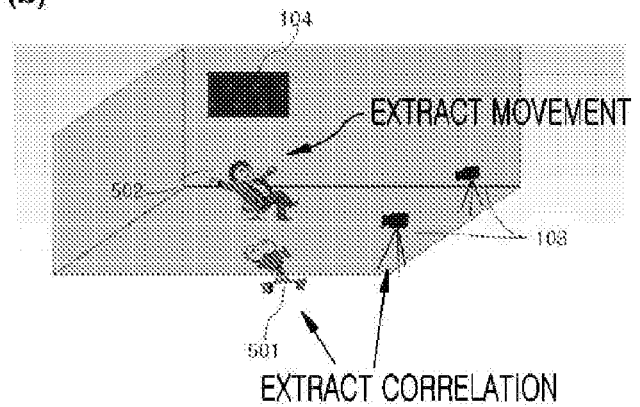
Figure 4:
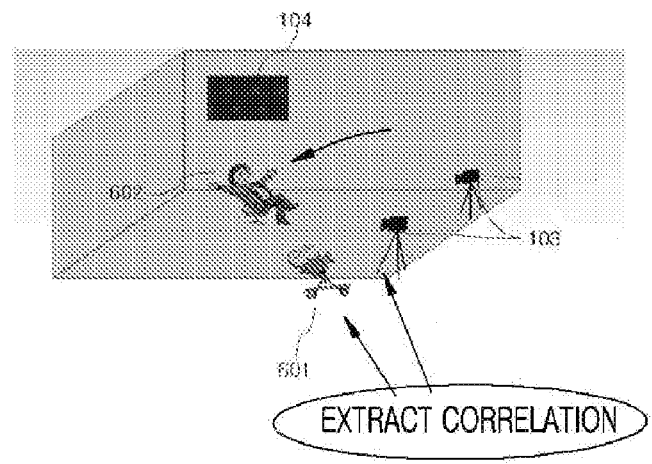

FIG. 4 illustrates examples of generating 3D motion data capable of being automatically composed with a real background image according to the motion capture method in FIG. 2, where (a) illustrates a first position of the moving camera for capturing a real background image, (b) illustrates a second position of the moving camera, and (c) illustrates a third position of the moving camera.

First, the fixed cameras and moving camera are installed as in FIGS. 3(a) to 3(c), and the correlation between the fixed cameras and moving camera is extracted for each position of the moving camera.

Then, when motion capture is performed on a moving subject to obtain humanoid character motion data, the 3D motion capture data generated from the real motion capture is automatically generated as 3D data linked to the moving camera capturing the real background image.

That is, motion data, generated as interaction with a third party or actual object such as a chair, table, etc. within the captured space, is generated as 3D motion data that can accurately be composed with data from the moving camera for capturing the real background image, so that the real background image and a humanoid character can easily be composed.

Referring to FIG. 4, FIG. 4(a) illustrates a first position of the moving camera 401 capturing the real background including the background marker 104. Similarly, FIG. 4(b) illustrates a second position of the moving camera 501 capturing the real background including the background marker 104, and FIG. 4(c) illustrates a third position of the moving camera 601 capturing the real background including the background marker 104.

Next, the fixed cameras 103 capture the moving subject at each point to extract the subject's movement.

Thus, 3D motion data can be generated that can automatically integrate a humanoid character (based on a real moving subject) with a real background for each position captured by a moving camera 401 to 601, extracted from the correlation between the moving camera 401 to 601 and fixed cameras 103, which is disclosed in Korean Patent Registration No. 0507780, entitled "Apparatus and Method for High-speed Marker-free Motion Capture", which is hereby incorporated by reference, and is thus omitted herefrom.

As described above, the motion capture apparatus and method according to the present invention use the correlation between motion capture fixed cameras and a moving camera for capturing a real background image to generate 3D motion data that can be precisely composed with the real background image, so that even when there is interaction between a 3D figure and an object such as a chair or table within the captured space, a humanoid character can easily be composed with the real background.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A motion capture system, comprising:
    a calibration frame for calibrating positions of a fixed camera for motion capture and a moving camera for capturing a real background;
    a fixed camera for capturing the calibration frame and a background marker or a corner point in a real background, and movement of a moving subject;
    a moving camera for moving and capturing the real background; and
    a motion capture processor for generating 3D motion data that extracts and automatically integrates a geometric correlation of the fixed camera and the moving camera with the real background.

2. The motion capture system of claim 1, wherein the background marker or the corner point comprises one of any form of a single point, line, and plane.

3. The motion capture system of claim 1, wherein the motion capture processor comprises:
    a correlation extractor for determining 3D geometric relative positions of the fixed camera and the background marker or the corner point, and extracting a geometric correlation of the fixed camera and the moving camera; and
    a 3D motion data generator for generating 3D motion data that automatically integrates the captured movement of the moving subject with the real background, according to the extracted geometric correlation.

4. The motion capture system of claim 3, wherein the 3D geometric relative positions of the fixed camera and the background marker or the corner point are obtained from a geometric relation between the calibration frame and the background marker or the corner point.

5. A method, comprising:
using a fixed camera for motion capture;
capturing a real background using a moving camera;
extracting a geometric correlation of the fixed camera and the moving camera; and
using the extracted correlation to capture motion of a real moving subject and generate 3D motion data automatically integrating the captured motion with the real background.

6. The method of claim 5, wherein the step of extracting the geometric correlation comprises the steps of:
obtaining a geometric relation between the fixed camera and a calibration frame; obtaining a geometric relation between the calibration frame and a background marker captured by the moving camera or a corner point in the real background;
obtaining 3D geometric relative positions of the fixed camera and the background marker or the corner point, using the obtained geometric relation through the calibration frame; and
obtaining 3D geometric relative positions of the fixed camera and the moving camera from the obtained 3D geometric relative positions of the fixed camera and the background marker or the corner point, and extracting a correlation of the fixed camera and the moving camera.

7. The method of claim 6, wherein the calibration frame calibrates a position of the fixed camera.

8. The method of claim 6, further comprising positioning the moving camera to simultaneously observe the calibration frame, and the background marker or corner point.

9. The method of claim 6, comprising using, as the background marker or the corner point one of any form of a single point, line, and plane.

* * * * *